(12) United States Patent
Hirooka et al.

(10) Patent No.: US 12,017,698 B2
(45) Date of Patent: Jun. 25, 2024

(54) STEERING DEVICE

(71) Applicant: YAMADA MANUFACTURING CO., LTD., Gunma (JP)

(72) Inventors: Koji Hirooka, Sichuan (CN); Peng Jiushuang, Sichuan (CN)

(73) Assignee: YAMADA MANUFACTURING CO., LTD., Kiryu (JP)

( * ) Notice: Subject to any disclaimer, the term of this patent is extended or adjusted under 35 U.S.C. 154(b) by 0 days.

(21) Appl. No.: 18/250,668

(22) PCT Filed: Oct. 20, 2021

(86) PCT No.: PCT/JP2021/038675
§ 371 (c)(1),
(2) Date: Apr. 26, 2023

(87) PCT Pub. No.: WO2022/102359
PCT Pub. Date: May 19, 2022

(65) Prior Publication Data
US 2023/0406395 A1    Dec. 21, 2023

(30) Foreign Application Priority Data

Nov. 13, 2020    (CN) .......................... 202011267209.6

(51) Int. Cl.
*B62D 1/185*    (2006.01)
*B62D 1/19*    (2006.01)

(52) U.S. Cl.
CPC .............. *B62D 1/185* (2013.01); *B62D 1/192* (2013.01)

(58) Field of Classification Search
CPC ......... B62D 1/185; B62D 1/192; B62D 1/195
See application file for complete search history.

(56) References Cited

U.S. PATENT DOCUMENTS 10,486,731 B2 * 11/2019 Ishikawa ................ B62D 1/184
2016/0167695 A1 * 6/2016 Hagiwara .............. B62D 1/195
74/493

(Continued)

FOREIGN PATENT DOCUMENTS

JP    2016-132308 A    7/2016

OTHER PUBLICATIONS

International Search Report corresponding to International Application No. PCT/JP2021/038675 dated Nov. 30, 2021, 2 pages.

*Primary Examiner* — Drew J Brown
(74) *Attorney, Agent, or Firm* — Rankin, Hill & Clark LLP

(57) ABSTRACT

A steering device includes a restricting bracket assembled with an inner pipe. The restricting bracket includes a single restricting plate, a pair of downwardly extended plates, and a pair of side plate portions. The restricting plate overlaps an outer circumferential surface of the inner pipe, and is provided with an elongated hole along the lengthwise direction of the inner pipe. A coupling bolt passing through the elongated hole tightens the restricting plate to the outer circumferential surface. Each side plate portion extends from a tip of each downwardly extended plate along the external surface of each clamping portion, and is held between each clamping portion and each outer column supporting portion. Each downwardly extended plate and each side plate portions are provided with respective telescopic adjustment elongated holes through which a clamping bolt passes. The coupling bolt moves forward in the elongated hole when a secondary collision occurs.

16 Claims, 10 Drawing Sheets

(56) References Cited

U.S. PATENT DOCUMENTS

2016/0311459 A1* 10/2016 Takahashi .............. B62D 1/185
2019/0047608 A1* 2/2019 Ishikawa ................ B62D 1/184

* cited by examiner

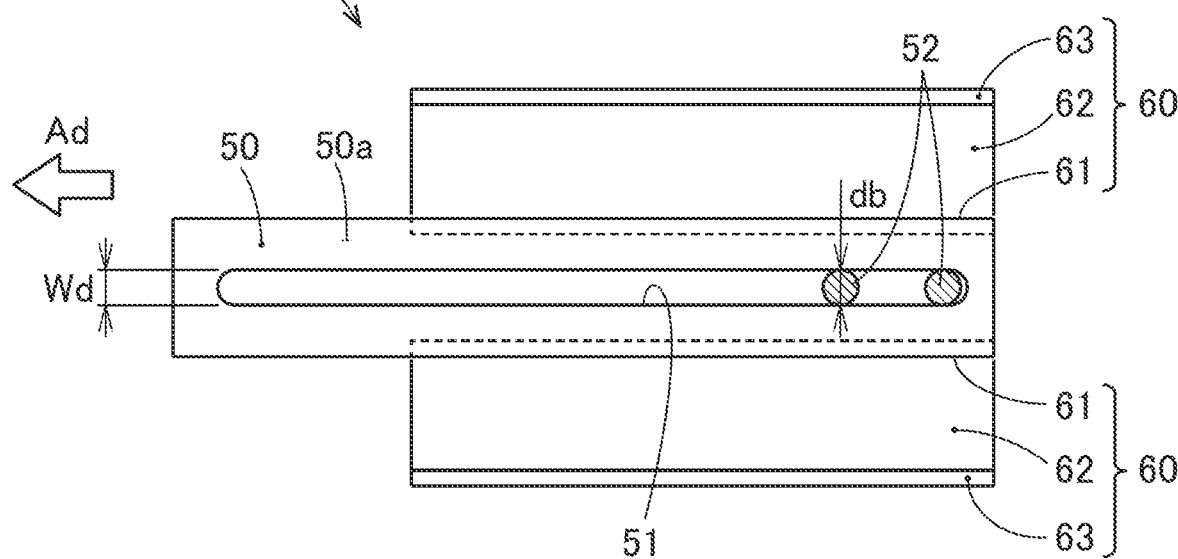
FIG.5
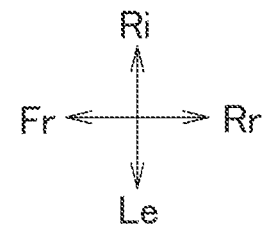

STEERING DEVICE

TECHNICAL FIELD

The present disclosure relates to an improving technology for a steering device with a telescopic adjustment mechanism.

BACKGROUND ART

Vehicles are driven by various body types of drivers. In recent years, a steering device is known which includes a telescopic adjustment mechanism that enables a so-called telescopic adjustment like adjustment of the position of a steering wheel in the back-and-forth direction in accordance with each driver's body type. A steering device disclosed in Patent Document 1 includes an outer column that holds an inner pipe in which a steering shaft is present so as to be movable and to be fastened in the vehicle back-and-forth direction.

A technology of the steering device disclosed in Patent Document 1 will be described with reference to FIG. 10A to FIG. 10C. FIG. 10A illustrates the drawings in FIG. 3 of Patent Document 1. FIG. illustrates the drawings in FIG. 2A of Patent Document 1. FIG. 10C illustrates the drawings in FIG. 2B of Patent Document 1. Reference numerals are newly given as appropriate.

As illustrated in FIG. 10A to FIG. 10C, a steering device 300 of Patent Document 1 has an outer column 303 (a circular-arc-shape portion 303) attached to a vehicle body 302 through a vehicle-body attachment bracket 301 (a bracket 301). The outer column 303 includes a pair of clamping portions 305 and 305 (to-be-fastened portions 305 and 305) that holds an inner pipe 304 (an inner jacket 304) so as to be movable and to be fastened in the vehicle back-and-forth direction. The vehicle-body attachment bracket 301 includes a pair of outer column supporting portions 306 and 306 (side plate portions 306 and 306) that hold therebetween the pair of clamping portions 305 and 305 from respective sides in the vehicle widthwise direction. A clamping bolt 307 passes through the pair of clamping portions 305 and 305, and the pair of outer column supporting portions 306 and 306. Provided between respective ends of the clamping bolt 307 and the pair of outer column supporting portions 306 and 306 is a pair of tightening members 308 and 308. By turning a lock lever 309 provided at the clamping bolt 307, the pair of tightening members 308 and 308 tighten the pair of clamping portions 305 and 305 and the pair of outer column supporting portions 306 and 306.

The inner pipe 304 is provided with a restricting bracket 310 (an energy absorbing unit 310) for restricting the range of telescopic adjustment. The restricting bracket 310 includes a pair of side plates 311 and 311 (friction plates 311 and 311), a pair of coupling portions 312 and 312, an engaging portion 313, and an energy absorbing portion 314.

Each of the pair of side plates 311 and 311 is present between each of the pair of outer column supporting portions 306 and 306, and, each of the pair of fastening members 308 and 308, and is a portion in a vertical plate shape that has a plate surface directed in the vehicle widthwise direction.

The pair of coupling portions 312 and 312 is located at the rear end in the restricting bracket 310, and is formed integrally with respective rear lower ends of the pair of side plates 311 and 311.

The engaging portion 313 is located at the front end in the restricting bracket 310, is a portion in a vertical plate shape that has a plate surface directed in the vehicle back-and-forth direction, and has the upper end fastened to the front end of the inner pipe 304 by welding, etc. That is, the engaging portion 313 extends vertically and downwardly from the front end of the inner pipe 304.

The energy absorbing portion 314 is a flat portion that connects respective lower ends of the pair of coupling portions 312 and 312, and the lower end of the engaging portion 313. Moreover, the energy absorbing portion 314 extends in a waveform shape toward the engaging portion 313 from the pair of coupling portions 312 and 312.

When a secondary collision occurs, the inner pipe 304 moves forward by collision energy. The engaging portion 313 moves forward together with the inner pipe 304. The front end of the energy absorbing portion 314 is pulled by the lower end of the engaging portion 313, thus attempting to move forward. However, the pair of side plates 311 and 311 is tightened by the pair of outer column supporting portions 306 and 306, and the pair of tightening members 308 and 308. Hence, the forward movement of the rear end of the energy absorbing portion 314 is restricted. Consequently, the energy absorbing portion in the waveform shape absorbs the collision energy by plastic deformation so as to extend toward the forward side.

As described above, the engaging portion 313 connects the inner pipe 304 at the upper side and the energy absorbing portion 314 at the lower side, thus being long and thin in the vertical direction. Hence, excessive bending stress is applied to the engaging portion 313 by the collision energy. When the upper part of the engaging portion 313 is bent toward the forward side, the collision energy is not sufficiently transmitted from the engaging portion 313 to the energy absorbing portion 314, and there is a tendency that the energy absorbing portion 314 does not sufficiently and promptly absorb the collision energy. In order to address this technical problem, it is necessary to sufficiently enhance the rigidity of the engaging portion 313 up to a perfect rigid body, and thus there is a leeway for improvement.

Moreover, the pair of side plates 311 and 311, and the energy absorbing portion 314 are coupled by the pair of coupling portions 312 and 312 only by the rear lower end of the restricting bracket 310, and thus there is a leeway for improvement of the rigidity of the whole restricting bracket 310 (the energy absorbing unit 310).

Furthermore, in order to allow the energy absorbing portion 314 to appropriately absorb the collision energy, it is necessary to sufficiently carry out the dimensional management and the rigidity management for the inner pipe 304 and for the engaging portion 313.

CITATION LIST

Patent Literatures

Patent Document 1: JP 2016-132308 A

SUMMARY OF INVENTION

Technical Problem

An objective of the present disclosure is to provide a steering device which enables a restricting bracket for restricting the telescopic adjustment range of an inner pipe to be formed by a singular member in such a steering device with a telescopic adjustment mechanism, is capable of sufficiently and promptly absorbing collision energy by such a restricting bracket when a secondary collision occurs, and is capable of accomplishing a cost-down.

Solution to Problem

According to the present disclosure as recited in claim 1, there is provided a steering device that includes:
an inner pipe that supports therein a steering shaft so as to be rotatable;
an outer column that includes a pair of clamping portions which holds the inner pipe so as to be movable and to be fastened in a vehicle back-and-forth direction;
a vehicle-body attachment bracket which includes a pair of outer column supporting portions that holds the pair of clamping portions from respective sides thereof in a widthwise direction, and which is attachable to a vehicle body;
a tightening mechanism that includes a clamping bolt which is capable of tightening the inner pipe through the pair of clamping portions and the pair of outer column supporting portions; and
a restricting bracket assembled with the inner pipe,
in which the restricting bracket is formed of a singular member that includes:
a restricting plate which is located between the pair of clamping portions so as to overlap an outer circumferential surface of the inner pipe, is provided with an elongated hole along a lengthwise direction of the inner pipe, has a relative displacement in the lengthwise direction of the inner pipe restricted by tightening force of a coupling bolt passing through the elongated hole, and is coupled to the outer circumferential surface of the inner pipe; and
a pair of leg portions that extends from the restricting plate toward the pair of clamping portions,
in which the pair of leg portions includes:
a pair of downwardly extended plates each in a vertical plate shape which extends along respective internal surfaces of the pair of clamping portions from the restricting plate, and which faces the respective internal surfaces of the pair of clamping portions;
a pair of bent portions each in a plate shape that is bent directly from respective tips of the pair of downwardly extended plates so as to circumvent respective tips of the pair of clamping portions; and
a pair of side plate portions each in a vertical plate shape which extends from the pair of bent portions, respectively, along respective external surfaces of the pair of clamping portions, and is present so as to be held between the pair of respective clamping portions and the pair of respective outer column supporting portions,
in which the pair of downwardly extended plates and the pair of side plate portions are provided with respective pairs of telescopic adjustment elongated holes through which the clamping bolt passes, and which are elongated in the lengthwise direction of the inner pipe, and
in which when a secondary collision occurs, the inner pipe and the coupling bolt move in the elongated hole of the restricting plate in a forward direction.

According to the present disclosure as recited in claim 2, it is preferable that:
the elongated hole of the restricting plate should include a rear first elongated hole located at a rear side of the restricting plate, a front second elongated hole continuously elongated from a front end of the first elongated hole toward a front side, and a protrusion located at a boundary between the first elongated hole and the second elongated hole; and
the coupling bolt should be fitted in the first elongated hole in a normal state in which no secondary collision is occurring.

According to the present disclosure as recited in claim 3, it is preferable that a front end of the elongated hole of the restricting plate should be an open end that enables the coupling bolt coupled to the inner pipe to come out when a secondary collision occurs.

According to the present disclosure as recited in claim 4, it is preferable that a surface of the restricting plate overlapping with the outer circumferential surface of the inner pipe should be formed in a circular arc shape along the outer circumferential surface.

According to the present disclosure as recited in claim 5, it is preferable that the internal surfaces of the pair of clamping portions should include a pair of rotation restricting portions that restrict respective rotations of the pair of downwardly extended plates.

Advantageous Effects of Invention

According to the present disclosure as set forth in claim 1, the restricting bracket is a singular member that includes the restricting plate, and the pair of leg portions each including the downwardly extended plate, the bent portion, and the side plate portion. The restricting plate overlaps the outer circumferential surface of the inner pipe, and is coupled to the outer circumferential surface of the inner pipe by the tightening force of the coupling bolt with the relative displacement in the lengthwise direction of the inner pipe being restricted by the friction of the inner pipe relative to the outer circumferential surface. Each downwardly extended plate of each of the pair of leg portions is formed in a vertical plate shape that faces the internal surface of the each of the corresponding clamping portion. Each bent portion of each of the pair of leg portions is a plate-shape portion that is directly bent from the tip of the pair of corresponding downwardly extended plates so as to circumvent the tip of the pair of corresponding clamping portions. Each side plate portion of each of the pair of leg portions is a portion which extends along the external surface of each clamping portion from each bent portion, and which is held between the pair of corresponding outer column supporting portions and the pair of corresponding clamping portions. Hence, the rigidity of the restricting bracket in the vehicle back-and-forth direction is quite high. By employing such a structure, when a secondary collision occurs, the restricting bracket can sufficiently receive collision energy. Accordingly, the forward movement of the restricting bracket due to the collision energy is surely restricted. Moreover, the inner pipe and the coupling bolt coupled to the inner pipe move along the elongated hole toward the vehicle front side, and the collision energy is absorbed by the tightening force of the coupling bolt and the friction with the restricting plate. Consequently, the collision energy can be sufficiently and promptly absorbed between the inner pipe and the restricting plate. Thus, the restricting plate provided with the elongated hole has a collision energy absorbing function.

Moreover, when the clamping bolt is loosened, the pair of downwardly extended plates and provided with the pair of respective telescopic adjustment elongated holes, and the pair of side plate portions provided with the pair of such holes move forward in the vehicle back-and-forth direction, enabling the position adjustment of the inner pipe in the vehicle back-and-forth direction (a telescopic adjusting function). When the clamping bolt is tightened, the pair of side plate portions can hold the inner pipe by friction obtained by being held between the pair of outer column supporting portions, respectively, and the pair of clamping portions, respectively (a telescopic holding function). As described above, the restricting bracket which is formed of a singular member can accomplish all of the three functions which are the telescopic adjusting function, the telescopic holding function, and the collision energy absorbing function. That is, the restricting bracket for restricting the telescopic adjustment range for the inner pipe can be formed of a singular member. The number of components that have the three functions can be thus reduced, and the assembling easiness can be enhanced. Consequently, the cost-down for the steering device can be accomplished.

According to the present disclosure as set forth in claim 2, the coupling bolt fitted in the first elongated hole and coupled to the inner pipe collides and causes the protrusion of the elongated hole to be deformed (including flaring and crushing), and start moving in the forward direction. The coupling bolt that has passed through the protrusion further causes the second elongated hole to be deformed (including flaring and crushing), moves in the forward direction, and absorbs collision energy. Consequently, the collision energy can be sufficiently and promptly absorbed between the inner pipe and the restricting plate.

According to the present disclosure as set forth in claim 3, since the front end of the elongated hole formed in the restricting bracket is the open end, the length of the restricting plate in the vehicle back-and-forth direction can be reduced by what corresponds to such an open end. This increases the degree of freedom for placement of the restricting plate relative to the vehicle-body attachment bracket, the outer column, and the inner pipe.

According to the present disclosure as set forth in claim 4, the surface of the restricting plate overlapping with the outer circumferential surface of the inner pipe is formed in a circular arc shape along the outer circumferential surface. This enables the restricting plate to be intimately in contact with the outer circumferential surface of the inner pipe.

According to the present disclosure as set forth in claim 5, the pair of rotation restricting portions that is provided on the respective internal surfaces of the pair of clamping portions can surely restrict respective rotations of the pair of downwardly extended plates. In addition, it is unnecessary to provide an additional member for restricting such rotations.

BRIEF DESCRIPTION OF DRAWINGS

FIG. 5 is a cross-sectional view of the restricting bracket and a coupling bolt taken along a line 5-5 in FIG. 4;

DESCRIPTION OF EMBODIMENTS

Embodiments of the present disclosure will be described below with reference to the accompanying figures. Note that embodiments illustrated in the figures are merely examples of the present disclosure, and the present disclosure is not limited to such embodiments. In the following description, terms right and left mean the right side and the left side with reference to a driver in a vehicle, and terms front and rear mean the front side and the rear side with reference to the running direction of the vehicle. In the figures, Fr, Rr, Le, Ri, Up and Dn indicate the front side, the rear side, the left side as viewed from the driver in the vehicle, the right side as viewed from the driver in the vehicle, the upper side, and the down side, respectively.

First Embodiment

Figure 1:
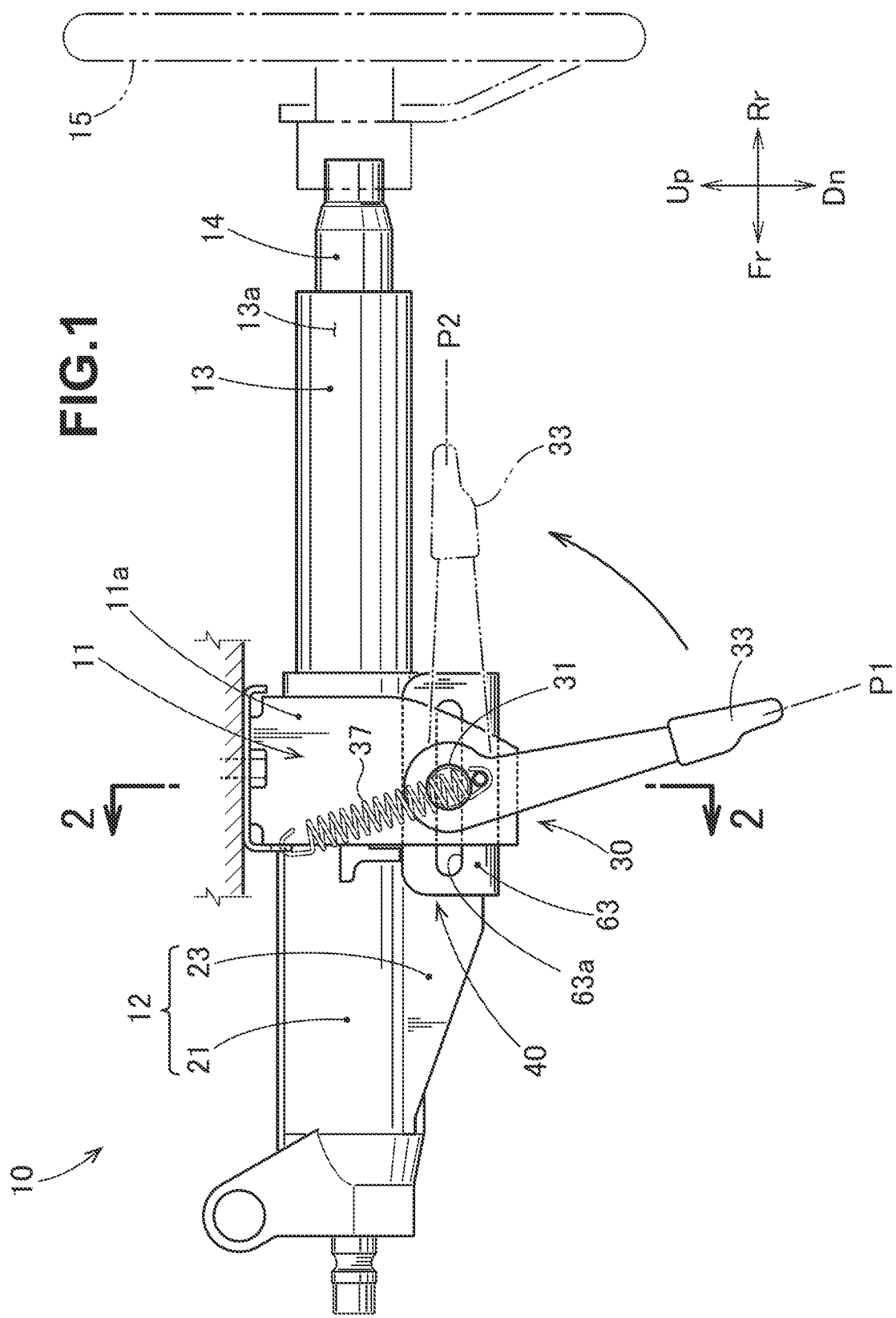
FIG. 1 is a left side view of a steering device according to a first embodiment.

With reference to FIG. 1 to FIG. 6, a steering device 10 according to a first embodiment will be described. As illustrated in FIG. 1, the steering device 10 includes a telescopic adjusting function and a tilt adjusting function. The telescopic adjusting function is a function that allows the driver to adjust, in accordance with the body type thereof, the position of the steering wheel 15 in the vehicle back-and-forth direction with the steering device 10 being attached to a vehicle body. The tilt adjusting function is a function that allows the driver to adjust, in accordance with the body type thereof, the tilting of the steering wheel 15 in the vertical direction relative to the vehicle body with the steering device 10 being attached to a vehicle body.

Figure 2:
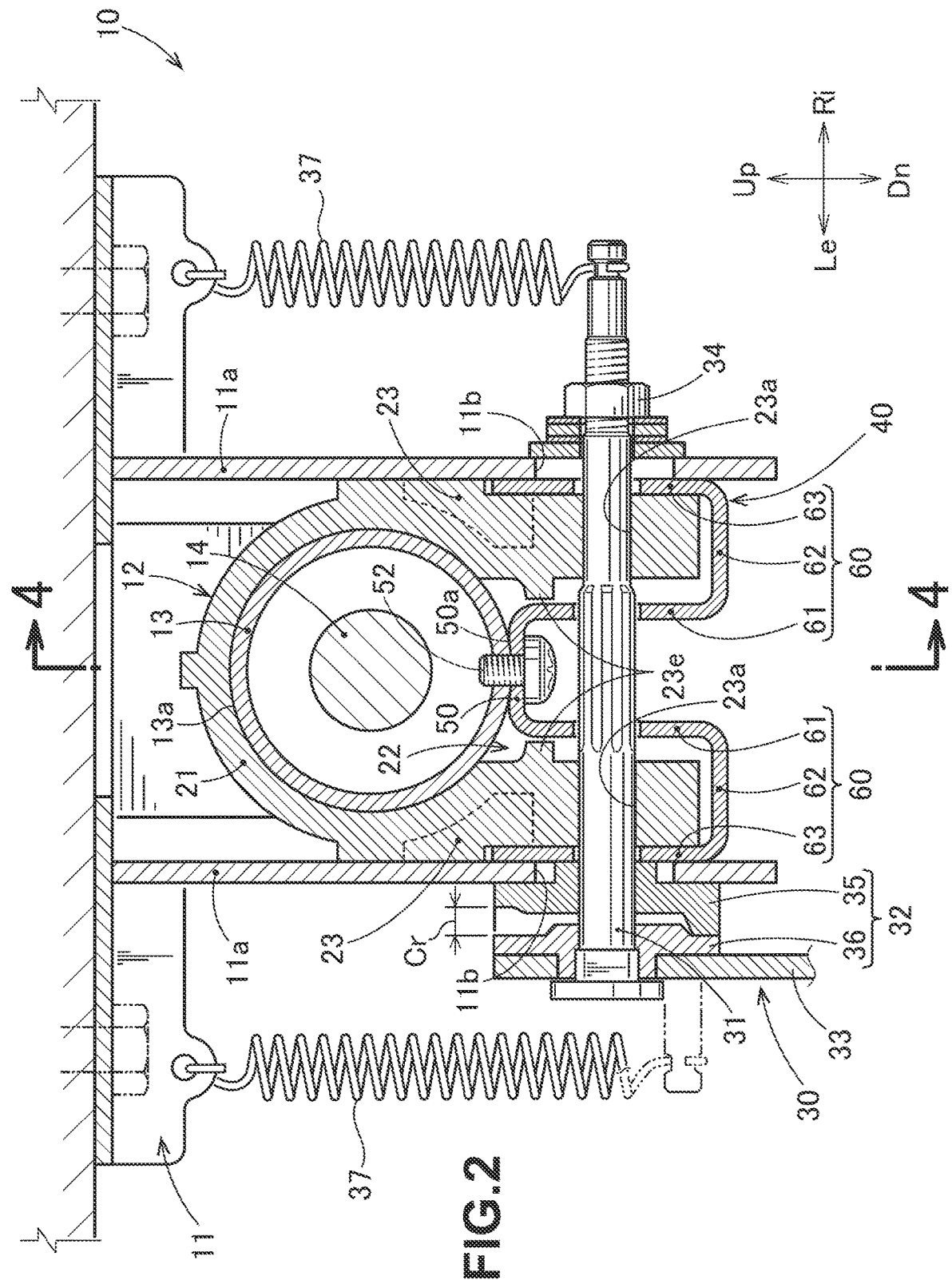
FIG. 2 is a cross-sectional view taken along a line 2-2 in FIG. 1.

As illustrated in FIG. 1 and FIG. 2, the steering device 10 includes a vehicle-body attachment bracket 11 that can be attached to the vehicle body, an outer column 12 that is supported by the vehicle-body attachment bracket 11 so as to be movable up and down (swingable), a cylindrical inner pipe 13 that is held by the outer column 12 so as to be movable and to be fastened in the vehicle back-and-forth direction, a steering shaft 14 that is present in the inner pipe 13, and a tightening mechanism 30 capable of tightening the inner pipe 13 to the outer column 12.

As described above, the outer column 12 is attached to the vehicle body through the vehicle-body attachment bracket 11. The steering shaft 14 is assembled with the inner pipe 13 through unillustrated bearings. The steering wheel 15 is attached to the rear end of the steering shaft 14.

As illustrated in FIG. 2, the vehicle-body attachment bracket 11 includes a pair of outer column supporting portions 11a and 11a (side plates 11a and 11a) that extends downwardly from respective sides in the widthwise direction. The pair of outer column supporting portions 11a and 11a is formed in a plate shape which faces with each other and substantially in parallel with each other, and each is provided with each elongated hole 11b and 11b for tilt adjustment in the vertical direction. Note that it is appropriate that the present disclosure has at least the telescopic adjusting function.

The shape of the outer column 12 is a substantially reversed U-shape as viewed from the steering wheel 15 (see FIG. 1). The outer column 12 is an integrally-molded component that includes a pipe holding portion 21 which holds the outer circumferential surface of the inner pipe 13, an opening 22 that is formed along the axial direction of the pipe holding portion 21, and a pair of clamping portions 23 and 23 that extends from the pipe holding portion 21 from respective sides of the opening 22 in the widthwise direction thereof.

The pair of clamping portions 23 and 23 is portions that hold the inner pipe 13 so as to be movable and to be fastened in the vehicle back-and-forth direction, and is placed between the pair of outer column supporting portions 11a and 11a. The external surface of each of the pair of clamping portions 23 and 23 in the vehicle widthwise direction adjoins the internal surface of each of the pair of outer column supporting portions 11a and 11a in the vehicle widthwise direction. The pair of outer column supporting portions 11a and 11a can hold the pair of clamping portions 23 and 23 from respective sides in the widthwise direction. Moreover, the pair of clamping portions 23 and 23 is provided with a pair of bolt insertion holes 23a and 23a, respectively, which pass completely through in the vehicle widthwise direction.

The tightening mechanism 30 can tighten the pair of clamping portions 23 and 23 with each other. The tightening mechanism 30 includes a clamping bolt 31, a tightening cam 32, an operation lever 33, and a nut 34.

The clamping bolt 31 passes through the respective elongated holes 11b and 11b of the pair of outer column supporting portions 11a and 11a, and the respective bolt insertion holes 23a and 23a of the pair of clamping portions 23 and 23. The outer column 12 is supported by the vehicle-body attachment bracket 11 through the clamping bolt 31. The clamping bolt 31 can tighten the inner pipe 13 through the pair of clamping portions 23 and 23 and through the pair of outer column supporting portions 11a and 11a.

The tightening cam 32 and the operation lever 33 are located outwardly in the vehicle widthwise direction relative to either one of the pair of outer column supporting portion 11a and 11a, e.g., the left outer column supporting portion 11a as viewed from the steering wheel 15. The nut 34 is located outwardly in the vehicle widthwise direction relative to the other one, and is threadedly mounted on the clamping bolt 31.

The tightening cam 32 includes a fastening cam 35 and a movable cam 36 which face with each other. The respective opposing surfaces of the fastening cam 35 and of the movable cam 36 which face with each other include respective cam robes. The fastening cam 35 is fitted in the elongated hole 11b of the left outer column supporting portion 11a as viewed from the steering wheel 15 so as to be slidable in the vertical direction and to have a restricted rotation. The clamping bolt 31 passes through the fastening cam 35. The movable cam 36 is fitted in the operation lever 33.

The operation lever 33 is an operation member that operates the clamping bolt 31 to rotate. The operation lever 33 is attached to the clamping bolt 31 so as to be rotatable together with the movable cam 36.

When the operation lever 33 is in a moving position P1 illustrated in FIG. 1 by a continuous line, the fastening cam 35 and the movable cam 36 which are illustrated in FIG. 2 come close to each other, and thus a clearance Cr becomes narrow. Accordingly, the fastening of the inner pipe 13 by the pipe holding portion 21 is released, enabling the inner pipe 13 to be displaced in the vehicle back-and-forth direction. Thus, a movable mode in which the position of the inner pipe 13 in the vehicle back-and-forth direction relative to the outer column 12 is adjustable is established by turning the clamping bolt 31 in one direction so as to loosen the tightening mechanism 30.

Subsequently, when the operation lever 33 is changed to a restricting position P2 indicated by an imaginary line by rotating and operating such a lever in the counter clockwise direction in FIG. 1, the fastening cam 35 and the movable cam 36 are spaced apart from each other, and thus the clearance Cr increases. The pair of clamping portions 23 and 23 are depressed by the pair of outer column supporting portions 11a and 11a tightened by the fastening cam 35 and the nut 34, and are deformed so as to come close to each other. Thus, a restricting mode in which the movement of the inner pipe 13 in the vehicle back-and-forth direction relative to the outer column 12 is restricted is established by turning the clamping bolt 31 in the other direction so as to tighten the tightening mechanism 30.

A pair of tension springs 37 and 37 suspends, through the clamping bolt 31, the outer column 12 at respective sides in the vehicle widthwise direction of the vehicle-body attachment bracket 11. When the clamping bolt 31 is loosened by the operation lever 33, the pair of tension springs 37 and 37 holds the outer column 12 by respective spring forces.

As is clear from the above description, the tightening mechanism 30 can change the holding state of the inner pipe 13 by the outer column 12 between the restricting mode and the movable mode. That is, the tightening mechanism 30 changes the state between the restricting state in which the movement of the inner pipe 13 in the lengthwise direction and in the vertical direction relative to the outer column 12 is restricted, and the permitting state that permits such a movement.

Figure 3:
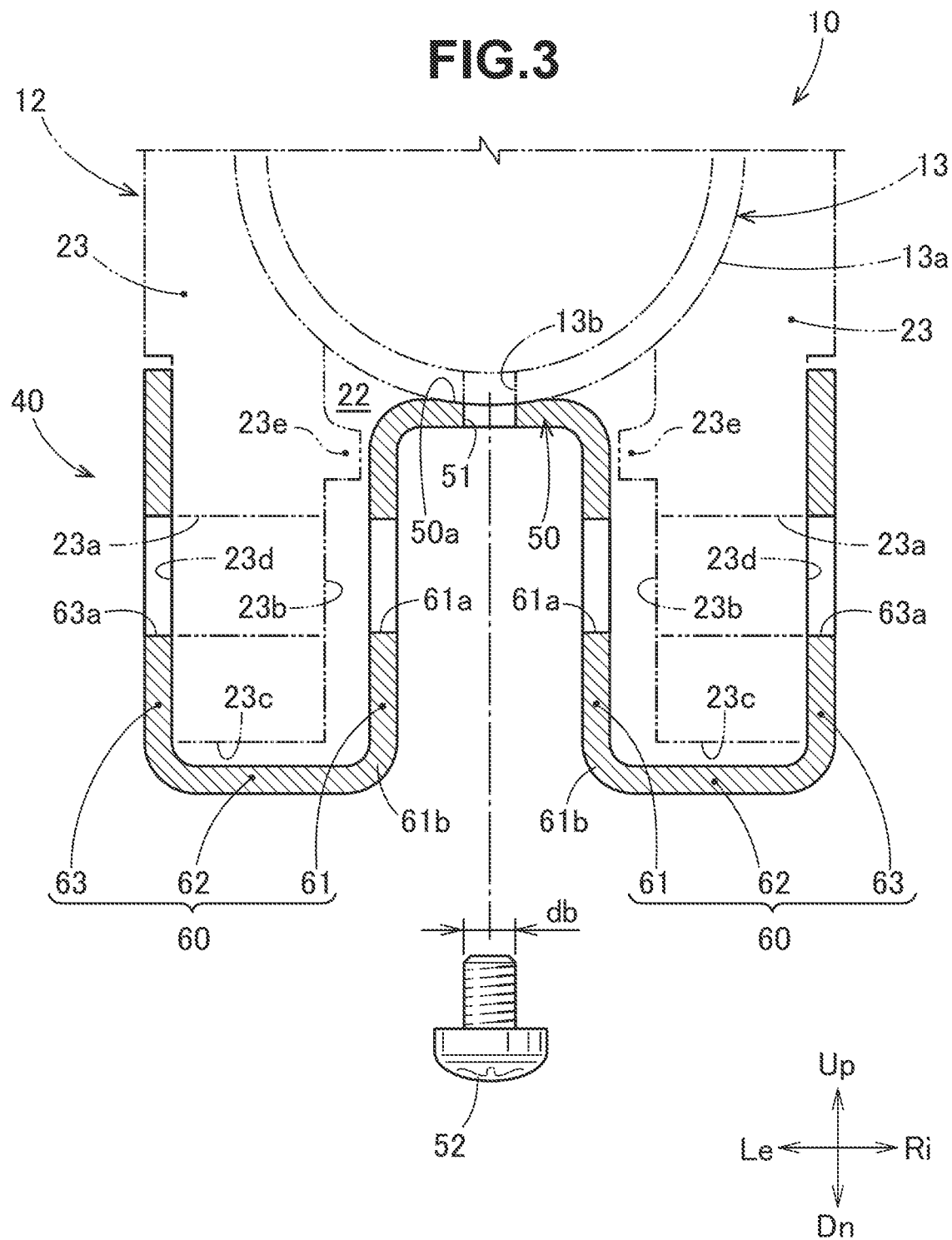
FIG. 3 is a cross-sectional view of a restricting bracket illustrated in FIG. 2.

Moreover, as illustrated in FIG. 2 and FIG. 3, the steering device 10 includes a restricting bracket 40 assembled with the inner pipe 13. The restricting bracket 40 is formed of a singular member which includes a bent component formed of a metal plate. More specifically, the restricting bracket 40 includes a restricting plate 50, and a pair of leg portions 60 and 60.

Figure 4:
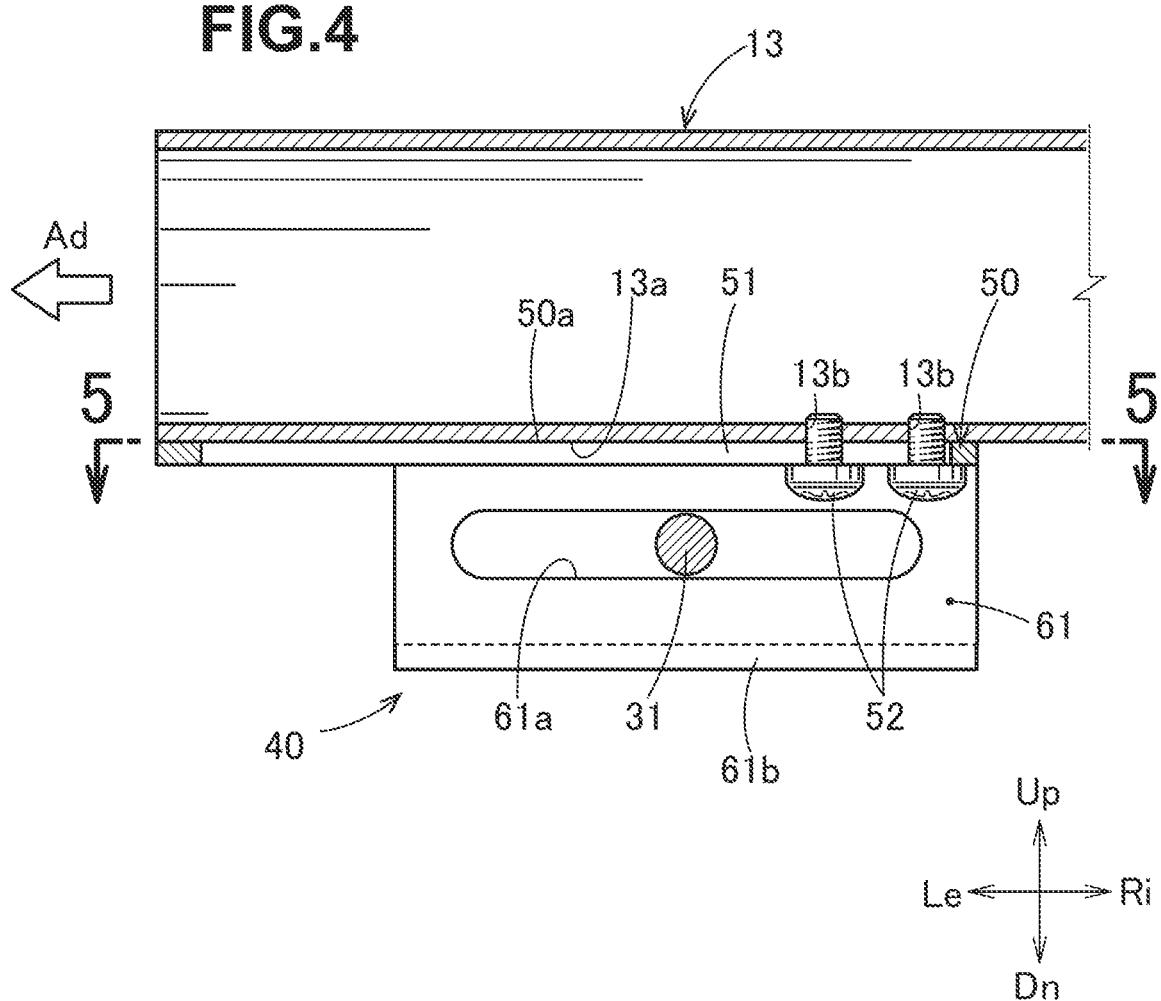
FIG. 4 is a cross-sectional view of an inner pipe and the restricting bracket taken along a line 4-4 in FIG. 2.

As illustrated in FIG. 3 and FIG. 4, the restricting plate 50 is located between the pair of clamping portions 23 and 23, overlaps an outer circumferential surface 13a of the inner pipe 13, and extends along the lengthwise direction of the inner pipe 13.

Furthermore, since a surface 50a (an overlapping surface 50a) of the restricting plate 50 which overlaps the outer circumferential surface 13a of the inner pipe 13 is formed in a circular arc shape along the outer circumferential surface 13a, the restricting plate 50 can be made so as to be intimately in contact with the outer circumferential surface 13a of the inner pipe 13.

As illustrated in FIG. 3 to FIG. 6, the restricting plate 50 is provided with an elongated hole 51 along the lengthwise direction of the inner pipe 13. The elongated hole 51 passes completely through the restricting plate 50 in the front-and-back direction thereof. At least one (e.g., two) coupling bolt 52 that passes through the elongated hole 51 is entwisted in a screw hole 13b of the inner pipe 13 (is coupled with the inner pipe 13). The restricting plate 50 is assembled with the inner pipe 13 by the coupling bolt 52. That is, the relative displacement of such a plate in the lengthwise direction of the inner pipe 13 is restricted by the friction to the outer circumferential surface 13a of the inner pipe 13, and such a plate is coupled to the outer circumferential surface 13a of the inner pipe 13 by the tightening force of the coupling bolt 52 passing through the elongated hole 51.

A width Wd of the elongated hole 51 is equally to or slightly larger than a diameter db of the shank of each coupling bolt 52 and 52. When the width Wd of the elongated hole 51 is excessive relative to the diameter db of the shank of each coupling bolt 52 and 52, there is a possibility such that fastening of the restricting plate 50 relative to the inner pipe 13 involves backlash. The coupling bolts 52 and 52 slide in a forward direction Ad along the elongated hole 51 when a secondary collision occurs.

As a modified example of the first embodiment, the above-described width Wd of the elongated hole 51 may be smaller than the diameter db of the shank of each coupling bolt 52 and 52 (i.e., Wd<db). In that case, when the secondary collision occurs, the coupling bolts 52 and 52 move while breaking the edge of the elongated hole 51 with pressure when sliding in the forward direction Ad.

Basically, it is appropriate that the number of the coupling bolts 52 should be one. By adjusting the number of the coupling bolts 52, friction force between the outer circumferential surface 13a of the inner pipe 13 and the overlapping surface 50a of the restricting plate 50 can be adjusted to an optimal value. In particular, the friction force when the inner pipe 13 starts sling in the forward direction Ad relative to the restricting plate 50 at the time of the secondary collision can be finely set by selecting the number of the coupling bolts 52.

Figure 6:
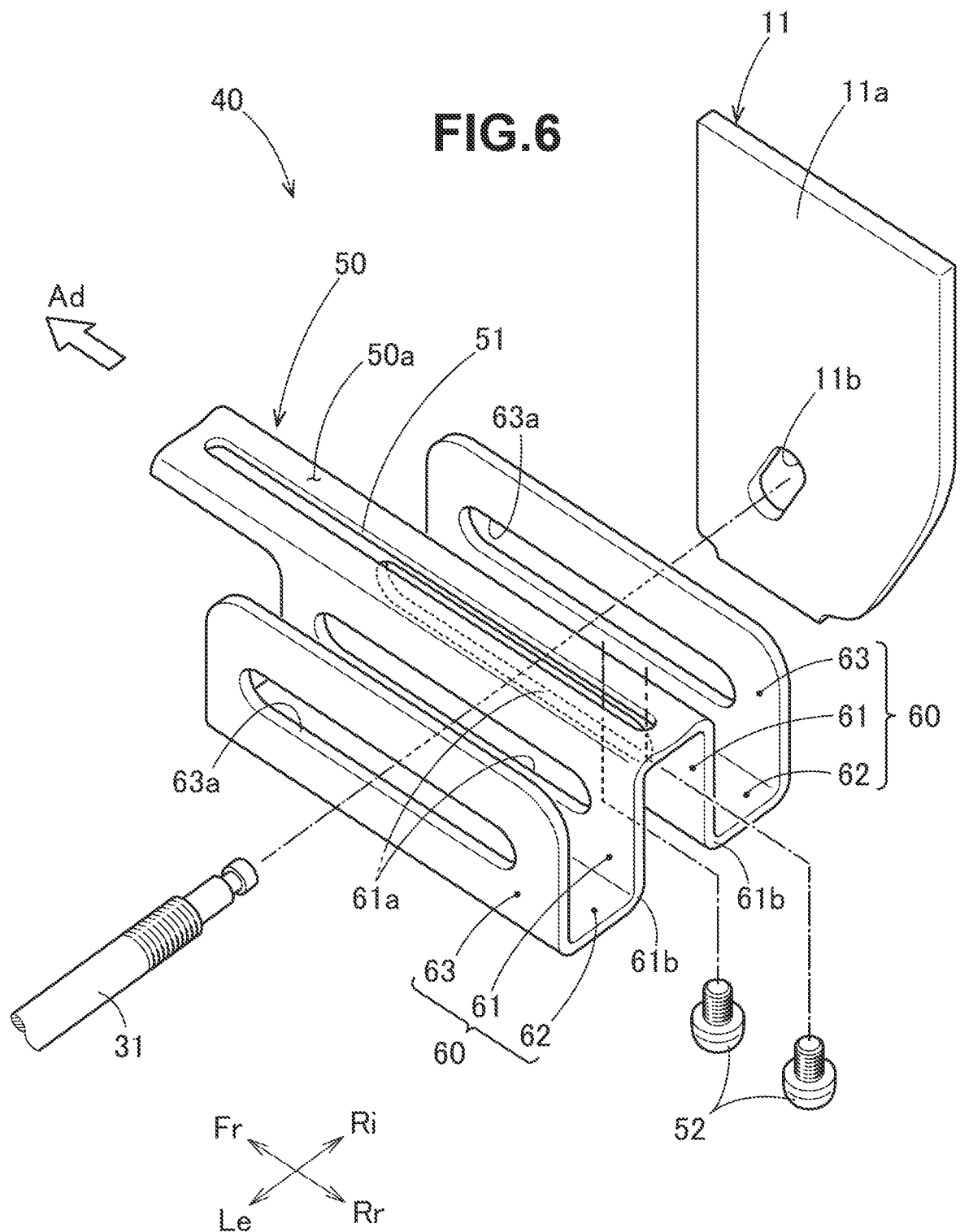
FIG. 6 is a perspective view of the restricting bracket illustrated in FIG. 2.

As illustrated in FIG. 3 and FIG. 6, the pair of leg portions 60 and 60 extends along the pair of clamping portions 23 and 23, respectively, from the restricting plate 50, each employs a U-shaped cross-sectional structure as viewed from the lengthwise direction of the inner pipe 13, and each is formed of a pair of respective downwardly extended plates 61 and 61, a pair of respective bent portions 62 and 62, and a pair of respective side plate portions 63 and 63.

The pair of downwardly extended plates 61 and 61 each employs a vertical-plate-shape structure which extends along respective internal surfaces 23b and 23b of the pair of clumping portions 23 and 23 from the restricting plate 50, and which faces the respective internal surfaces 23b and 23b of the pair of clamping portions 23 and 23. The pair of downwardly extended plates 61 and 61 is provided with a pair of telescopic adjustment elongated holes 61a and 61a, respectively, which is elongated in the lengthwise direction of the inner pipe 13 and through which the clamping bolt 31 can pass (see FIG. 4).

The pair of bent portions 62 and 62 employs a planar structure that is bent directly from respective tips 61b and 61b (respective lower ends 61b and 61b) of the pair of downwardly extended plates 61 and 61 so as to circumvent respective tips 23c and 23c (respective lower ends 23c and 23c) of the pair of clamping portions 23 and 23.

The pair of side plate portions 63 and 63 each employs a vertical-plate-shape structure which extends respective external surfaces 23d and 23d of the pair of clamping portions 23 and 23 from the pair of respective bent portions 62 and 62, and is present so as to be held between the pair of clamping portions 23 and 23, and, the pair of outer column supporting portions 11a and 11a (see FIG. 3). In other words, the pair of side plate portions 63 and 63 extends along the respective external surfaces 23d and 23d of the pair of clamping portions 23 and 23 from the respective tips 61b and 61b of the pair of downwardly extended plates 61 and 61, and is present between the pair of clamping portions 23 and 23, and, the pair of outer column supporting portions 11a and 11a so as to be held therebetween. Moreover, the pair of side plate portions 63 and 63 is provided with the pair of respective telescopic adjustment elongated holes 63a and 63a which is elongated in the lengthwise direction of the inner pipe 13 and through which the clamping bolt 31 can pass (see FIG. 6).

As illustrated in FIG. 3, the above-described internal surfaces 23b and 23b of the pair of clamping portions 23 and 23 includes a pair of respective rotation restricting portions 23e and 23e which restricts the respective rotations of the pair of downwardly extended plates 61 and 61. Each of the rotation restricting portions 23e and 23e is a portion that protrudes toward each of the pair of downwardly extended plates 61 and 61 from each of the internal surfaces 23b and 23b. Hence, the pair of rotation restricting portions 23e and 23e can surely restrict the respective rotations of the pair of downwardly extended plates 61 and 61. In addition, it is unnecessary to provide an additional member for restricting such rotations.

Next, as illustrated in FIG. 1, actions of the steering device 10 will be described when a secondary collision is applied from the steering wheel 15 to the inner pipe 13 in the restricting mode in which the operation lever 33 is changed to the restricting position P2.

At a time point before the secondary collision is applied, in the restricting mode, as illustrated in FIG. 2, the pair of side plate portions 63 and 63 of the restricting bracket 40 is tightened by the pair of outer column supporting portions 11a and 11a, and, the pair of clamping portions 23 and 23, thus maintaining the present positions by respective friction forces.

Moreover, as illustrated in FIG. 4 and FIG. 5, the restricting plate 50 overlaps the outer circumferential surface 13a of the inner pipe 13, is coupled to the outer circumferential surface 13a of the inner pipe 13 by the tightening forces of the coupling bolts 52 with the relative displacement in the lengthwise direction of the inner pipe 13 being restricted by the friction force to the outer circumferential surface 13a of the inner pipe 13, and thus the present position is maintained. That is, the restricting plate 50 is directly assembled with the outer circumferential surface 13a of the inner pipe 13.

Subsequently, when a secondary collision occurs, the collision energy is directly transmitted from the inner pipe 13 to the restricting plate 50, and is further transmitted from the restricting plate 50 to the pair of leg portions 60 and 60. That is, the collision energy is transmitted from the restricting plate 50 to the pair of side plate portions 63 and 63 through the pair of downwardly extended plates 61 and 61.

The pair of leg portions 60 and 60 each has a U-shaped cross section as viewed from the lengthwise direction of the inner pipe 13. Each of the downwardly extended plates 61 and 61 of each of the pair of leg portions 60 and 60 employs a vertical-plate structure that faces the corresponding internal surfaces 23b and 23b of the pair of clamping portions 23 and 23. Hence, the rigidity of each of the downwardly extended plates 61 and 61 in the vehicle back-and-forth direction is quite high.

Each of the bent portions 62 and 62 of each of the pair of leg portions 60 and 60 is a plate-shape portion that is bent directly from the corresponding tips 61b and 61b of the pair of downwardly extended plates 61 and 61 so as to circumvent the corresponding tips 23c and 23c of the pair of clamping portions 23 and 23. Hence, the rigidity of each of the bent portions 62 and 62 in the vehicle back-and-forth direction is also quite high.

As illustrated in FIG. 2, since it is in a state in which the clamping bolt 31 is tightened, the pair of side plate portions 63 and 63 can sufficiently receive collision energy by the friction force obtained by being held between the pair of outer column supporting portions 11a and 11a, and, the pair of clamping portions 23 and 23. Accordingly, the forward movement of the restricting plate 50 by the collision energy is surely restricted.

Since each of the leg portions 60 and 60 employs a highly rigid combination structure accomplished by each of the downwardly extended plates 61 and 61, each of the bent portions 62 and 62, and each of the pair of side plate portions 63 and 63, the rigidity in the vehicle back-and-forth direction is quite high. At the time of the secondary collision, the pair of downwardly extended plates 61 and 61, the pair of bent portions 62 and 62, and the pair of side plate portions 63 and 63 prevent the restricting plate 50 from moving, thereby maintaining the telescopic position.

As illustrated in FIG. 4 and FIG. 5, when collision force (collision energy) is produced which exceeds the friction force between the inner pipe 13 and the restricting plate 50, the inner pipe 13 and the coupling bolts 52 move forward in the forward direction Ad (a vehicle front side Ad) relative to the outer column 12 and the restricting plate 50 while absorbing the collision energy by the friction force. The collision energy is absorbed by the friction force between the inner pipe 13 and the restricting plate 50 by the tightening force of the coupling bolts 52 and 52. The inner pipe 13 and the coupling bolts 52 and 52 move forward in the forward direction Ad (the vehicle front side Ad) relative to the outer column 12 and the restricting plate 50 along the elongated hole 51.

The above description can be summarized as follows.

As illustrated in FIG. 4, the restricting plate 50 provided with the elongated hole 51 has a collision energy absorbing function.

Moreover, as illustrated in FIG. 2 and FIG. 3, when the clamping bolt 31 is loosened, the pair of downwardly extended plates 61 and 61 provided with the pair of respective telescopic adjustment elongated holes 61a and 61a, and the pair of side plate portions 63 and 63 provided with the pair of respective elongated holes 63a and 63a move forward in the vehicle back-and-forth direction, enabling the position adjustment of the inner pipe 13 (a telescopic adjusting function).

As illustrated in FIG. 2, when the clamping bolt 31 is tightened, the pair of side plate portions 63 and 63 can hold the inner pipe 13 by friction obtained by being held between the pair of outer column supporting portions 11a and 11a, respectively, and the pair of clamping portions 23 and 23, respectively (a telescopic holding function).

As described above, the restricting bracket 40 which is formed of a singular member can accomplish all of the three functions which are the telescopic adjusting function, the telescopic holding function, and the collision energy absorbing function. That is, the restricting bracket 40 for restricting the telescopic adjustment range for the inner pipe 13 can be formed of a singular member. The number of components that have the three functions can be thus reduced, and the assembling easiness can be enhanced. Consequently, the cost-down for the steering device 10 can be accomplished.

Next, a restricting bracket 140 of steering device 100 according to a second embodiment will be described with reference to FIG. 7 and FIG. 8.

Second Embodiment

Figure 7:
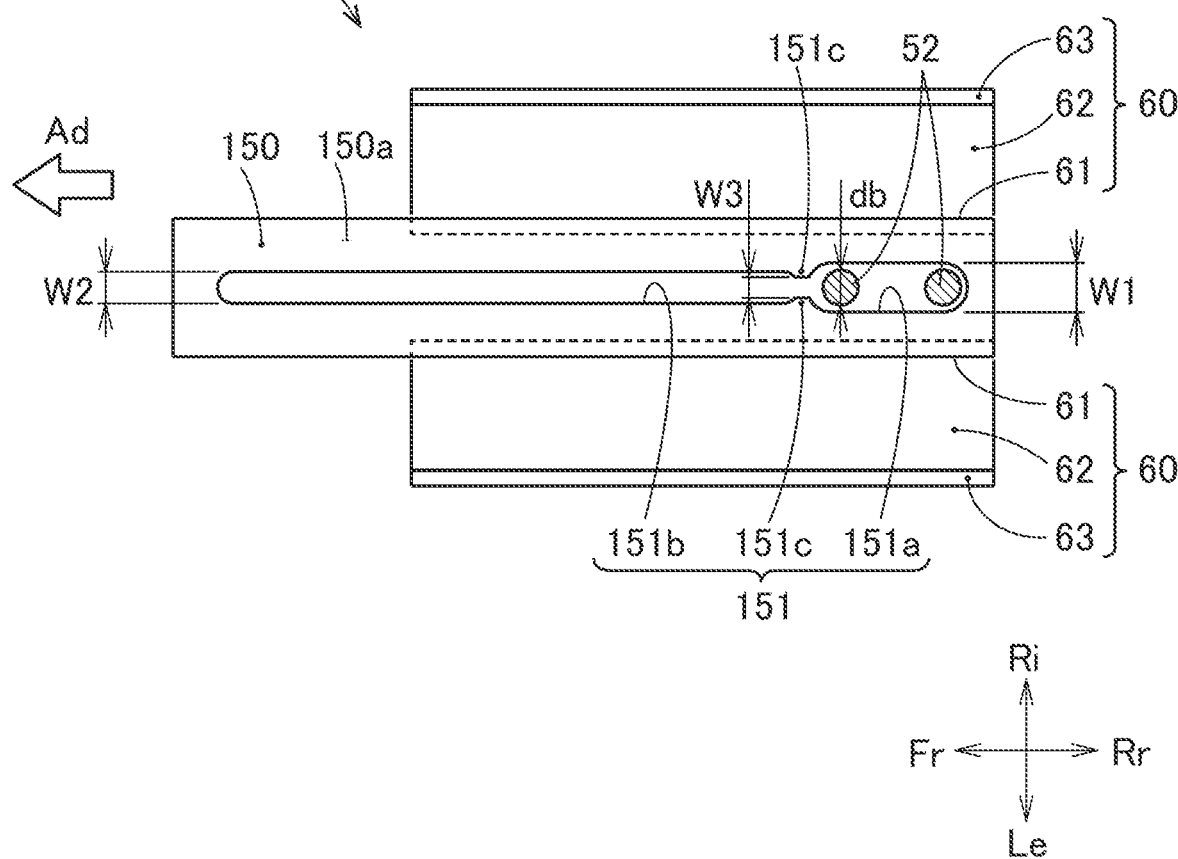
FIG. 7 is a plan view of a restricting bracket of a steering device according to a second embodiment.

FIG. 7 illustrates the restricting bracket 140 of the steering device 100 according to the second embodiment, and is drawn so as to correspond to FIG. 5. FIG. 8 illustrates the restricting bracket 140 of the steering device 100 according to the second embodiment, and is drawn so as to correspond to FIG. 6.

Figure 8:
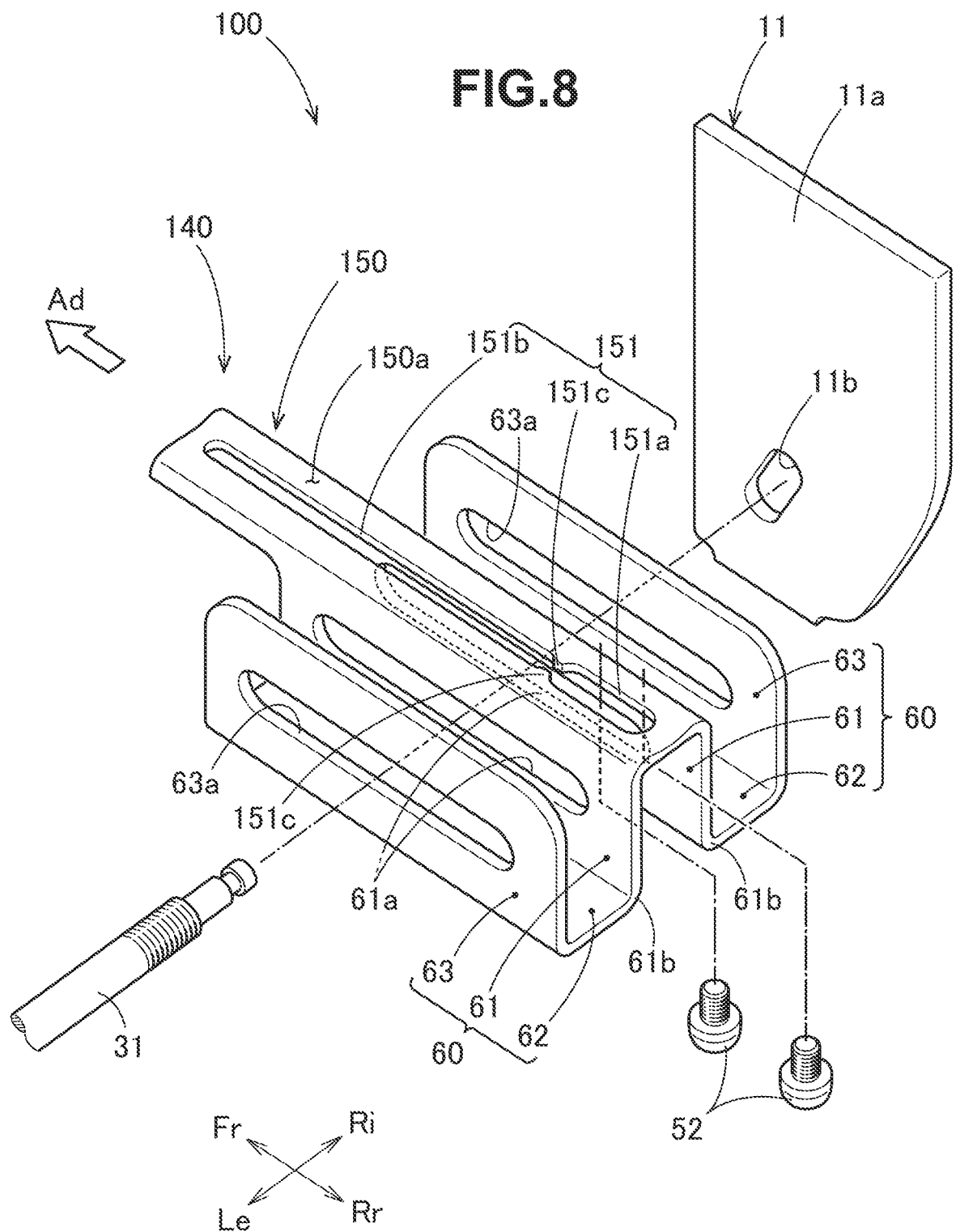
FIG. 8 is a perspective view of the restricting bracket of the steering device according to the second embodiment.

The restricting bracket 140 of the second embodiment has a feature such that the above-described restricting plate 50 of the first embodiment illustrated in FIG. 1 to FIG. 6 is changed to a restricting plate 150 illustrated in FIG. 7 and FIG. 8. The other basic structures are common to those of the above-described steering device 10 of the first embodiment. The same component as that of the steering device 10 according to the first embodiment will be denoted by the same reference numeral, and the detailed description thereof will be omitted.

The restricting plate 150 of the second embodiment has an overlapping surface 150a that employs the same structure as that of the overlapping surface 50a of the first embodiment (see FIG. 3). The restricting plate 150 is provided with an elongated hole 151 illustrated in FIG. 7 and FIG. 8 instead of the elongated hole 51 of the first embodiment.

Similar to the elongated hole 51 of the first embodiment, the elongated hole 151 is formed along the lengthwise direction of the inner pipe 13, and is cut out from the restricting plate 150 in the front-and-back direction thereof. The restricting plate 150 is assembled with the inner pipe 13 by the coupling bolts 52. That is, such a plate is coupled to the outer circumferential surface 13a of the inner pipe 13 by the tightening forces of the coupling bolts 52 passing through the elongated hole 151 with the relative displacement of such a plate in the lengthwise direction of the inner pipe 13 being restricted by friction to the outer circumferential surface 13a of the inner pipe 13.

The elongated hole 151 includes a rear first elongated hole 151a located at the rear side of the restricting plate 50, a front second elongated hole 151b that continuously extends from the front end of the first elongated hole 151a, and a pair of protrusions 151c and 151c located at the boundary between the first elongated hole 151a and the second elongated hole 151b.

In a normal state in which no secondary collision occurs, the elongated hole 151a is a portion where the coupling bolts 52 and 52 pass through and are entwisted in the respective screw holes 13b of the inner pipe 13. A width W1 of the first elongated hole 151a is equal to or slightly larger than a diameter db of the shank of the coupling bolt 52.

The second elongated hole 151b is a portion where the coupling bolts 52 and 52 located in the first elongated hole 151a enter while breaking the pair of protrusions 151c and 151c by pressure when a secondary collision occurs and such bolts slide in the forward direction Ad. A width W2 of the second elongated hole 151b is equal to or slightly larger than the diameter db of the shank of the coupling bolt 52. That is, the width W2 of the second elongated hole 151b is the same as the width W1 of the first elongated hole 151a.

As illustrated in FIG. 7, the pair of protrusions 151c and 151c is located so as to face with each other in a planer view. A clearance W3 between the pair of protrusions 151c and 151c is smaller than the width W1 of the first elongated hole 151a (W3<W1). By reducing the clearance W3 between the protrusions 151c and 151c, when the coupling bolts 52 and 52 slide in the forward direction Ad at the time of the occurrence of a secondary collision, such bolts collide the protrusions 151c and 151c, and deformation load is applied thereto.

When collision force (collision energy) is produced which is greater than the friction force between the inner pipe 13 (see FIG. 4) and the restricting plate 150, the inner pipe 13 and the coupling bolts 52 move forward in the forward direction Ad (the vehicle front side Ad) relative to the outer column 12 and to the restricting plate 150 while absorbing the collision energy by the friction force. The collision energy is absorbed by the friction force between the inner pipe 13 and the restricting plate 150 accomplished by the tightening forces of the coupling bolts 52 and 52. The inner pipe 13 and the coupling bolts 52 and 52 move forward in the forward direction Ad (the vehicle front side Ad) relative to the outer column 12 and to the restricting plate 150 along the first elongated hole 151*a*.

The coupling bolts 52 coupled to the inner pipe 13 collide and cause the pair of protrusions 151*c* and 151*c* of the elongated hole 151 to be deformed (including flaring and crushing), and start moving in the forward direction Ad. The collision energy is absorbed by load accomplished by the collision and deformation of the protrusions 151*c* and 151*c* which are caused by the coupling bolts 52 and 52 in addition to the friction force between the inner pipe 13 and the restricting plate 150 by the tightening force of the coupling bolts 52 and 52.

As a modified example of the second embodiment, the width W2 of the above-described second elongated hole 151*b* may be smaller than the diameter db of the shank of the coupling bolts 52 and 52 (W2<db). The clearance W3 between the pair of protrusions 151*c* and 151*c* may be smaller than the width W2 of the second elongated hole 151*b* (W3<W2). In such a case, when a secondary collision occurs, the coupling bolts 52 and 52 absorb, when sliding in the forward direction Ad, collision energy by load accomplished by the coupling bolts 52 and 52 that collide and cause the protrusions 151*c* and 151*c* to be deformed in addition to friction force between the inner pipe 13 and the restricting plate 150 by the tightening force of the coupling bolts 52 and 52. The coupling bolts 52 and 52 that pass through the protrusions 151*c* and 151*c* further cause the second elongated hole 151*b* to be deformed (including flaring and crushing), and move in the forward direction Ad, thereby absorbing the collision energy. Consequently, the collision energy can be fully and promptly absorbed between the inner pipe 13 and the restricting plates 150.

Note that a structure in which only either one of the pair of protrusions 151*c* and 151*c* is provided may be employed.

Next, a restricting bracket 240 of a steering device 200 according to a third embodiment will be described with reference to FIG. 9.

Third Embodiment

Figure 9:
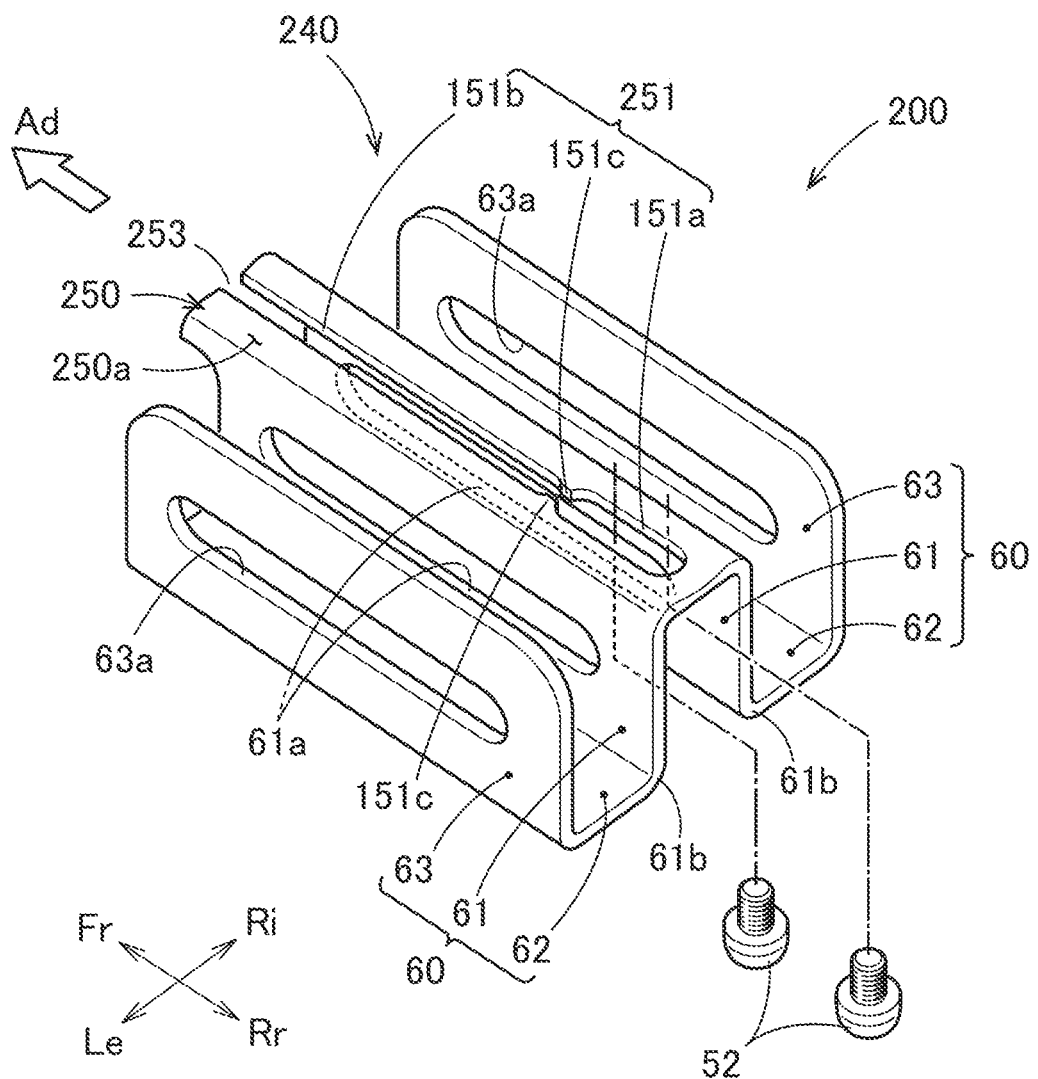
FIG. 9 is a perspective view of a restricting bracket of a steering device according to a third embodiment.
Figure 10A:
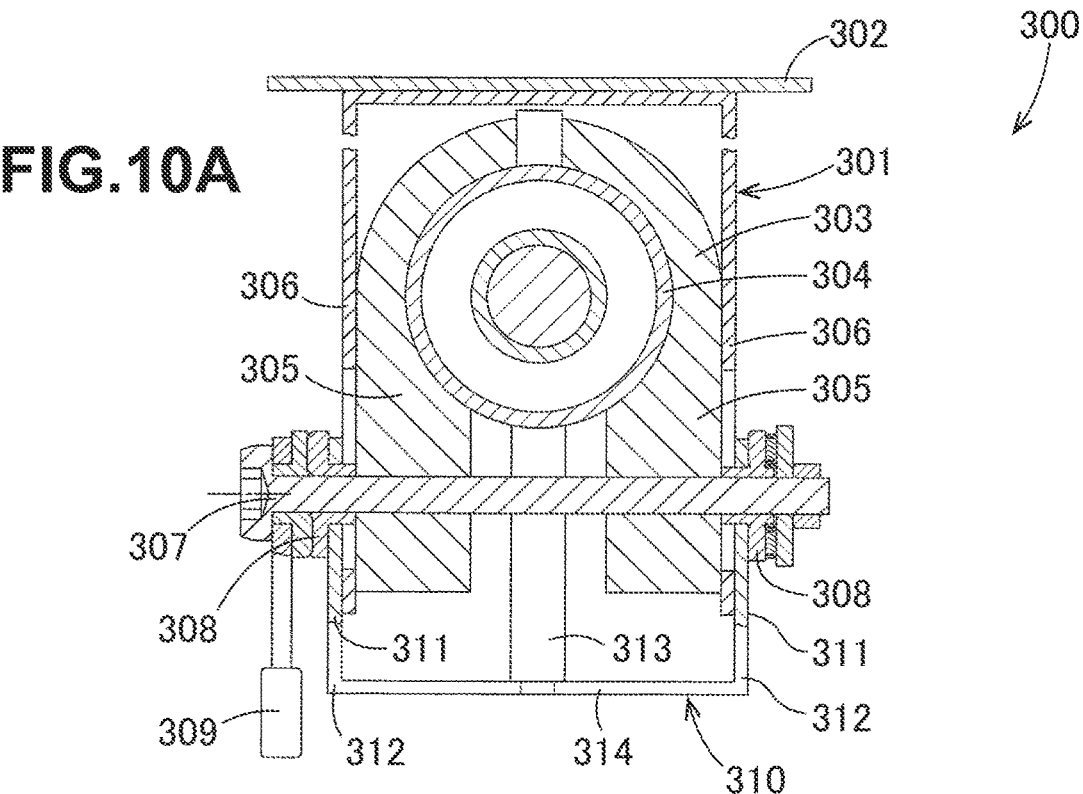
FIG. 10A is a cross-sectional view of a conventional steering device as viewed from the lengthwise direction of an inner pipe.
Figure 10B:
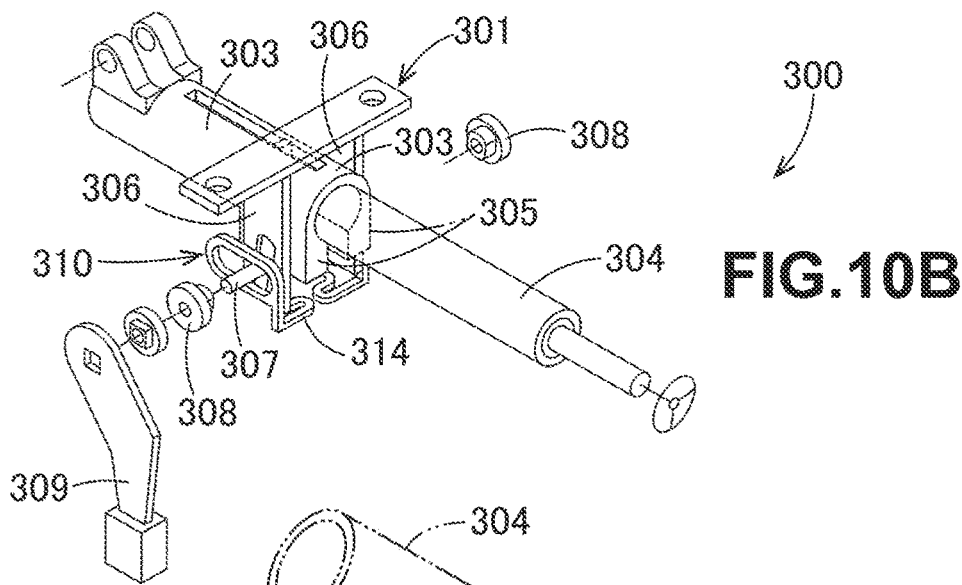
FIG. 10B is an assembly diagram of the inner pipe with a restricting bracket illustrated in FIG. 10B.
Figure 10C:
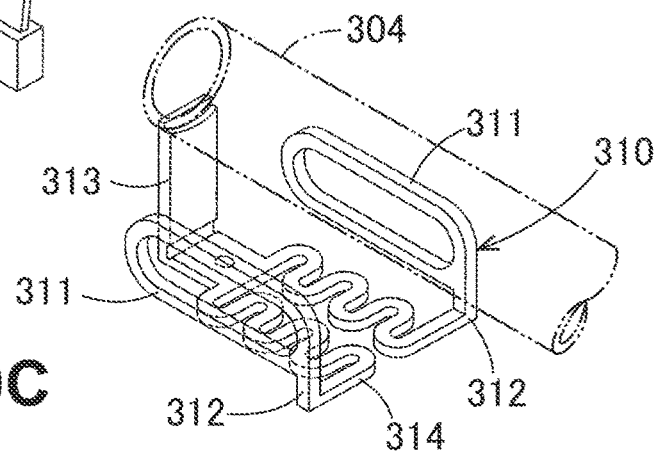
FIG. 10C is an enlarged diagram of a major part of the inner pipe and that of the restricting bracket illustrated in FIG. 10A.

FIG. 9 illustrates the restricting bracket 240 of the steering device 200 according to the third embodiment, and is illustrated so as to correspond to FIG. 6.

The restricting bracket 240 of the third embodiment has a feature such that the restricting plate 150 of the second embodiment illustrated in FIG. 8 is changed to a restricting plate 250 illustrated in FIG. 9. The other basic structures are common to those of the steering device 100 of the second embodiment. The common component to that of the steering device 100 according to the second embodiment will be denoted by the same reference numeral, and the detailed description thereof will be omitted.

The restricting plate 250 of the third embodiment has an overlapping surface 250*a* that employs the same structure as that of the overlapping surface 50*a* (see FIG. 3) of the first embodiment. The restricting plate 250 is provided with a slit 251 instead of the elongated hole 151 (see FIG. 8) of the second embodiment. The slit 251 has an end 253 in the forward direction Ad of the inner pipe 13 as an open end 253, and the other structures are the same as those of the elongated hole 151 of the second embodiment illustrated in FIG. 7 and FIG. 8. That is, the end of the second elongated hole 151*b* in the forward direction Ad is designed as the open end 253.

The description on the third embodiment will be summarized as follows. As illustrated in FIG. 9, the restricting plate 250 includes the slit 251 along the lengthwise direction of the inner pipe 13 (see FIG. 4). The restricting plate 250 is coupled to the outer circumferential surface 13*a* of the inner pipe 13 by the tightening forces of the coupling bolts 52 passing through the slit 251 with the relative displacement of such a plate in the lengthwise direction of the inner pipe 13 being restricted by friction to the outer circumferential surface 13*a* (see FIG. 4) of the inner pipe 13. The end 253 of the slit 251 in the forward direction Ad of the inner pipe 13 is the open end 253 where the coupling bolts 52 coupled to the inner pipe 13 can come out when a secondary collision occurs.

Hence, when collision force (collision energy) is produced which is greater than the friction force between the inner pipe 13 and the restricting plate 250, the inner pipe 13 and the coupling bolts 52 move forward in the forward direction Ad (the vehicle front side Ad) relative to the restricting plate 250 while absorbing collision energy by friction force. Consequently, the collision energy can be fully and promptly absorbed between the inner pipe 13 and the restricting plates 250. When the forward movement of the coupling bolt 52 coupled to the inner pipe 13 in the forward direction Ad is large, such a bolt can come out from the open end 253.

Since the restricting plate 252 of the third embodiment has the end 253 in the forward direction Ad of the inner pipe 13 as the open end 53, the length of the restricting plate 252 in the vehicle back-and-forth direction can be reduced. This increases the degree of freedom for placement of the restricting plate 252 relative to the vehicle-body attachment bracket 11, the outer column 12, and the inner pipe 13 which are illustrated in FIG. 2, and reduces the manufacturing costs of the restricting plate 252.

The other advantageous effects of the steering device 200 according to the third embodiment are the same as those of the steering device 100 according to the second embodiment illustrated in FIG. 7 and FIG. 8.

Note that as far as the actions and advantageous effects of the present disclosure are accomplishable, the present disclosure is not limited to the above embodiments, and can be applied to various kinds of steering devices.

Moreover, according to the present disclosure, the presence of the tilt adjustment mechanism is optional.

Furthermore, the slit 251 of the restricting plate 250 according to the third embodiment may be a structure adopted instead of the elongated hole 51 (see FIG. 6) of the first embodiment.

INDUSTRIAL APPLICABILITY

The steering devices 10, 100 and 200 of the present disclosure are suitably applicable to the steering system of a passenger vehicle.

REFERENCE SIGNS LIST

10, 100, 200 Steering device
11 Vehicle-body attachment bracket
11*a* Outer column supporting portion 12 Outer column
13 Inner pipe
13a Outer circumferential surface of inner pipe
14 Steering shaft
23 Clamping portion
23b Internal surface of clamping portion
23c Tip of clamping portion (lower end)
23d External surface of clamping portion
23e Rotation restricting portion
30 Tightening mechanism
31 Clamping bolt
40, 140, 240 Restricting bracket
50, 150, 250 Restricting plate
52 Coupling bolt
60 Leg portion
61 Downwardly extended plate
61a Telescopic adjustment elongated hole
61b Tip of downwardly extended plate (lower end)
62 Bent portion
63 Side plate portion
63a Telescopic adjustment elongated hole
51 Elongated hole
151 Elongated hole
151a First elongated hole
151b Second elongated hole
151c Protrusion
251 Slit
253 Open end of slit (end in restricting plate in forward direction of inner pipe)
Ad Forward direction of inner pipe 13

The invention claimed is:

1. A steering device comprising:
an inner pipe that supports therein a steering shaft so as to be rotatable;
an outer column that comprises a pair of clamping portions which holds the inner pipe so as to be movable and to be fastened in a vehicle back-and-forth direction;
a vehicle-body attachment bracket which comprises a pair of outer column supporting portions that holds the pair of clamping portions from respective sides thereof in a widthwise direction, and which is attachable to a vehicle body;
a tightening mechanism that comprises a clamping bolt which is capable of tightening the inner pipe through the pair of clamping portions and the pair of outer column supporting portions; and
a restricting bracket assembled with the inner pipe,
wherein the restricting bracket is formed of a singular member that comprises:
a restricting plate which is located between the pair of clamping portions so as to overlap an outer circumferential surface of the inner pipe, is provided with an elongated hole along a lengthwise direction of the inner pipe, has a relative displacement in the lengthwise direction of the inner pipe restricted by tightening force of a coupling bolt passing through the elongated hole, and is coupled to the outer circumferential surface of the inner pipe; and
a pair of leg portions that extends from the restricting plate toward the pair of clamping portions,
wherein the pair of leg portions comprises:
a pair of downwardly extended plates each in a vertical plate shape which extends along respective internal surfaces of the pair of clamping portions from the restricting plate, and which faces the respective internal surfaces of the pair of clamping portions;
a pair of bent portions each in a plate shape that is bent directly from respective tips of the pair of downwardly extended plates so as to circumvent respective tips of the pair of clamping portions; and
a pair of side plate portions each in a vertical plate shape which extends from the pair of bent portions, respectively, along respective external surfaces of the pair of clamping portions, and is present so as to be held between the pair of respective clamping portions and the pair of respective outer column supporting portions,
wherein the pair of downwardly extended plates and the pair of side plate portions are provided with respective pairs of telescopic adjustment elongated holes through which the clamping bolt passes, and which are elongated in the lengthwise direction of the inner pipe, and
wherein when a secondary collision occurs, the inner pipe and the coupling bolt move in the elongated hole of the restricting plate in a forward direction.

2. The steering device according to claim 1, wherein:
the elongated hole of the restricting plate comprises a rear first elongated hole located at a rear side of the restricting plate, a front second elongated hole continuously elongated from a front end of the first elongated hole toward a front side, and a protrusion located at a boundary between the first elongated hole and the second elongated hole; and
the coupling bolt is fitted in the first elongated hole in a normal state in which no secondary collision is occurring.

3. The steering device according to claim 2, wherein a front end of the elongated hole of the restricting plate is an open end that enables the coupling bolt coupled to the inner pipe to come out when a secondary collision occurs.

4. The steering device according to claim 1, wherein a front end of the elongated hole of the restricting plate is an open end that enables the coupling bolt coupled to the inner pipe to come out when a secondary collision occurs.

5. The steering device according to claim 1, wherein a surface of the restricting plate overlapping with the outer circumferential surface of the inner pipe is formed in a circular arc shape along the outer circumferential surface.

6. The steering device according to claim 1, wherein the internal surfaces of the pair of clamping portions comprise a pair of rotation restricting portions that restrict respective rotations of the pair of downwardly extended plates.

7. The steering device according to claim 2, wherein a surface of the restricting plate overlapping with the outer circumferential surface of the inner pipe is formed in a circular arc shape along the outer circumferential surface.

8. The steering device according to claim 4, wherein a surface of the restricting plate overlapping with the outer circumferential surface of the inner pipe is formed in a circular arc shape along the outer circumferential surface.

9. The steering device according to claim 3, wherein a surface of the restricting plate overlapping with the outer circumferential surface of the inner pipe is formed in a circular arc shape along the outer circumferential surface.

10. The steering device according to claim 2, wherein the internal surfaces of the pair of clamping portions comprise a pair of rotation restricting portions that restrict respective rotations of the pair of downwardly extended plates.

11. The steering device according to claim 4, wherein the internal surfaces of the pair of clamping portions comprise a pair of rotation restricting portions that restrict respective rotations of the pair of downwardly extended plates.

12. The steering device according to claim 5, wherein the internal surfaces of the pair of clamping portions comprise a pair of rotation restricting portions that restrict respective rotations of the pair of downwardly extended plates.

13. The steering device according to claim 3, wherein the internal surfaces of the pair of clamping portions comprise a pair of rotation restricting portions that restrict respective rotations of the pair of downwardly extended plates.

14. The steering device according to claim 7, wherein the internal surfaces of the pair of clamping portions comprise a pair of rotation restricting portions that restrict respective rotations of the pair of downwardly extended plates.

15. The steering device according to claim 8, wherein the internal surfaces of the pair of clamping portions comprise a pair of rotation restricting portions that restrict respective rotations of the pair of downwardly extended plates.

16. The steering device according to claim 9, wherein the internal surfaces of the pair of clamping portions comprise a pair of rotation restricting portions that restrict respective rotations of the pair of downwardly extended plates.

* * * * *